United States Patent [19]

Cornet et al.

[11] Patent Number: 5,662,759
[45] Date of Patent: Sep. 2, 1997

[54] APPARATUS AND METHOD FOR PROVIDING UNIFORM STRETCHED EDGES OF STRIP MATERIAL FOR SPLICING

[75] Inventors: Francis Cornet, Habay-la-Neuve, Belgium; Robert Albert Lammlein, Jr., Cuyahoga Falls, Ohio; Roger Marthoz, Arlon, Belgium; John Kolbjorn Roedseth, Bissen, Luxembourg

[73] Assignee: The Goodyear Tire & Rubber Company, Akron, Ohio

[21] Appl. No.: 352,531

[22] Filed: Dec. 9, 1994

[51] Int. Cl.$^6$ .............. B32B 31/18; B29C 55/06
[52] U.S. Cl. .......... 156/229; 156/250; 156/258; 156/353; 156/361; 156/495; 156/517; 83/18; 83/175; 83/370; 264/160
[58] Field of Search .............. 156/64, 217, 218, 156/229, 351, 353, 361, 494, 495, 250, 258, 517; 83/18, 175, 370, 508; 425/142; 264/40.1, 138, 160, 229

[56] References Cited

U.S. PATENT DOCUMENTS

| | | | |
|---|---|---|---|
| 2,981,134 | 4/1961 | Johnson | 83/18 |
| 3,081,959 | 3/1963 | Goodwin | 156/361 X |
| 4,216,184 | 8/1980 | Thomas | 264/229 |
| 4,359,675 | 11/1982 | Miller, III | 318/603 |
| 4,426,901 | 1/1984 | Hogan et al. | 83/861 |
| 4,470,866 | 9/1984 | Satoh et al. | 156/495 X |
| 4,516,451 | 5/1985 | Takeshita et al. | 83/171 |
| 4,857,123 | 8/1989 | Still et al. | 156/229 X |
| 4,874,443 | 10/1989 | Kipling | 156/64 |
| 4,909,878 | 3/1990 | Watanabe | 156/494 X |
| 4,961,813 | 10/1990 | Bailey | 156/353 X |
| 5,021,115 | 6/1991 | Tokita | 156/406.6 |
| 5,293,795 | 3/1994 | Osawa et al. | 83/16 |

FOREIGN PATENT DOCUMENTS

| | | | |
|---|---|---|---|
| 785055 | 12/1980 | U.S.S.R. | 83/175 |
| 1442414 | 12/1988 | U.S.S.R. | 83/18 |

*Primary Examiner*—David A. Simmons
*Assistant Examiner*—Paul M. Rivard
*Attorney, Agent, or Firm*—Frederick K. Lacher

[57] ABSTRACT

A strip of resilient material is clamped uniformly across the width of the material at a first position by vertically spaced clamps which are separated to stretch a section of the material beyond the elastic limit. The stretched section of material is released and transported on a horizontal conveyor to a second position where the stretched section is cut by a cutter providing edges of reduced thickness which are suitable for overlapping other stretched edges of reduced thickness for splicing.

4 Claims, 7 Drawing Sheets

APPARATUS AND METHOD FOR PROVIDING UNIFORM STRETCHED EDGES OF STRIP MATERIAL FOR SPLICING

BACKGROUND OF THE INVENTION

1. Field of Invention

This invention relates to the art of methods and apparatus for preparing the edges of resilient elastomeric sheet material for splicing and especially to inner liners for tires.

2. Description of the Related Art

Heretofore inner liners have been applied to a tire drum and the end edges overlapped to provide a splice. This has not been satisfactory because the overlapping causes a heavy spot and results in an imbalance of the tire. To avoid this two layers of inner liner material have been wrapped around the tire drum. This is not economical because it requires twice the length of inner liner than is necessary. The other alternative has been to connect the end edges with a connecting strip. Here again the balance of the tire is adversely affected. When a butt splice of the inner liner end edges is used the lubricant applied to the tire building drum may be caught in a corner between the ends of the inner liner and this cause a crack in the inner liner which results in a defective tire.

Attempts have been made to prepare the edges of inner liners for splicing by crushing a section of the inner liner and then cutting that section which results in crushed end edges. In another prior art method and apparatus for preparing edges of reinforced elastomeric material a section of material clamped between spaced apart clamps is stretched by a wedge member and a knife is inserted through the wedge member to cut the material. The stretching is within the elastic range of the sheet material and heat is applied to retard the elastic recovery so that a reduced thickness of the edges is maintained during splicing. Also no provision is made for conveying the cut sections to another location.

SUMMARY OF THE INVENTION

The present invention provides apparatus for stretching a section of a strip of elastomeric material such as an inner liner for a tire beyond the elastic limit of the material in a manner such that there is uniform stretching across the width of the material. The end edges to be spliced are of uniform thickness across the inner liner and a uniform splice results. The stretching of the material is accomplished with the material in a vertical position which facilitates the disengagement of the clamps from the material so that it can be transferred to a horizontal conveyor where the section of reduced thickness may be cut. Corrugation of the stretched section which may result from stretching the material beyond the elastic limit has been found to produce a good splice after cutting and splicing.

In accordance with one aspect of the invention there is provided an apparatus for reducing the thickness and cutting a strip of material comprising a first clamping assembly for clamping a first portion of the strip of material, a second clamping assembly positioned adjacent the first clamping assembly for clamping a second portion of the strip of material, means for actuating the first clamping assembly and the second clamping assembly to clamp the first portion and the second portion of the strip of material and means to separate the first clamping assembly and the second clamping assembly to stretch a section of the strip of material between the first clamping assembly and the second clamping assembly a predetermined distance to stress the section of the strip of material beyond the elastic limit of the material and a cutter for cutting the section.

In accordance with another aspect of the invention there is provided a method of reducing the thickness and cutting a strip of material comprising clamping a first portion of the strip of material with a first clamping assembly at a first position on the strip of material, clamping a second portion of the strip of material with a second clamping assembly at a second position on the strip of material adjacent the first position, stretching a section of the strip of material between the first position and the second position by separating the first clamping assembly and the second clamping assembly a distance sufficient to stress the strip of material beyond the elastic limit of the material providing a section of the strip of material between the first position and the second position having a reduced thickness and cutting the section between the first position and the second position to provide edges of the strip of material having a reduced thickness.

Other benefits and advantages of the invention will become apparent to those skilled in the art to which it pertains upon a reading and understanding of the following detailed specification.

BRIEF DESCRIPTION OF THE DRAWINGS

The invention may take physical form in certain parts and certain arrangement of parts, a preferred embodiment of which will be described in detail in the specification and illustrated in the accompanying drawings, which form a part hereof and wherein.

DESCRIPTION OF THE PREFERRED EMBODIMENT

Figure 1:
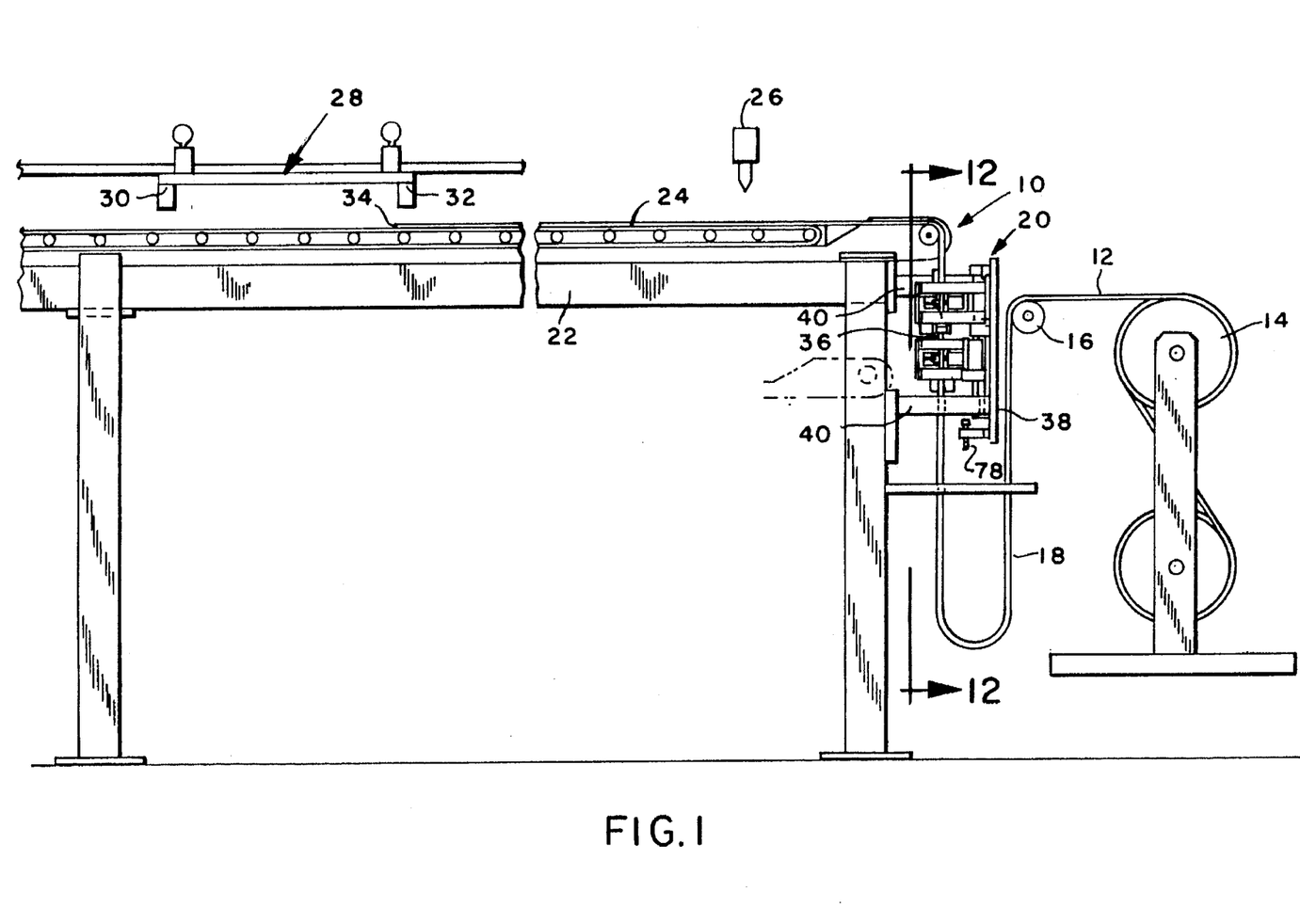
FIG. 1 is a schematic side elevation of a stretching a cutting assembly 10 for a strip of resilient material in the form of a flat elongated sheet member such an inner liner 12 for a tire.

Referring to FIG. 1, a cutter and stretching assembly 10 is shown for stretching and cutting an inner liner 12 which may be stored on a let-off roll 14. The inner liner 12 is directed over a roller 16 through a festoon 18 to a stretching assembly 20 mounted on a frame 22. The belt conveyor 24 is mounted on the frame 22 for conveying the inner liner 12 in a horizontal direction under a cutter 26 to a measuring apparatus 28. A first photoeye 30 and a second photoeye 32 are mounted on the measuring apparatus 28 above the conveyor 24. The measuring apparatus 28 is connected to controls for actuating the conveyor 24 and the stretching assembly 20. When an end 34 of the inner liner 12 passes under the second photoeye 32 the resulting signal causes the belt conveyor 24 to stop with a section 36 of the inner liner 12 in position for stretching in the stretching assembly 20.

Figure 2:
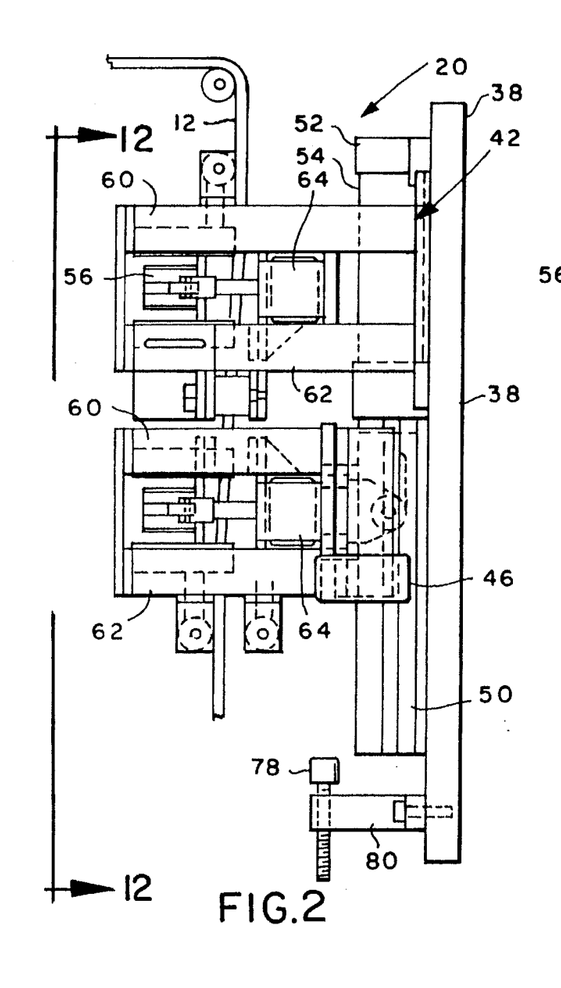
FIGS. 2, 3 and 4 are detailed views of the clamping apparatus in different operating positions.
Figure 3:
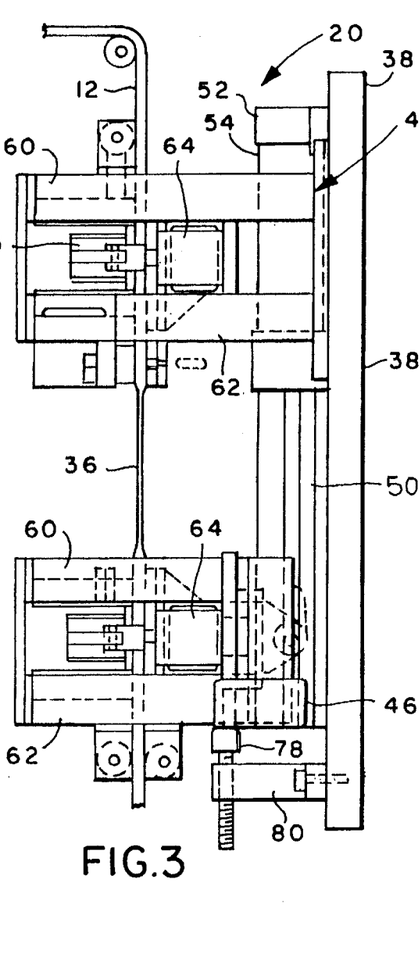

Referring to FIGS. 1, 2, 11 and 12, the stretching assembly 20 is shown in greater detail. A support plate 38 is connected to the frame 22 by arms 40. A first clamping assembly 42 is mounted on the support plate 38 at an upper position 44. A second clamping assembly 46 has pillow blocks 48 slidably mounted on rails 50 attached to the support plate 38 for vertical movement relative to the first clamping assembly. The second clamping assembly 46 is attached by a piston of a piston cylinder assembly 52 for vertical movement of the second clamping assembly 46 relative to the first clamping assembly 42. The cylinder 54 of the piston cylinder assembly 52 may be in communication with a source of air pressure such as factory air. The first clamping assembly 42 and the second clamping assembly 46 have horizontal support members 60 and 62 at each end of the clamping assemblies for supporting the clamping bars 56 and 58 at the ends thereof. The outer clamping bars 58 are mounted in fixed positions between the horizontal support members 60 and 62 and the inner clamping bars 56 are slidably mounted for movement toward and away the outer clamping bars 58. Piston cylinder assemblies 64 which are mounted on the horizontal supports 60,62 are connected to the inner clamping bars 56 and in communication with a source of air pressure to move the inner clamping bars relative to the outer clamping bars 58. This is illustrated in FIGS. 2 and 3, where the clamping bars 56 and 58 are separated in the positions shown in FIG. 2 and pulled together to clamp the inner liner 12 in the positions shown in FIG. 3.

Figure 5:
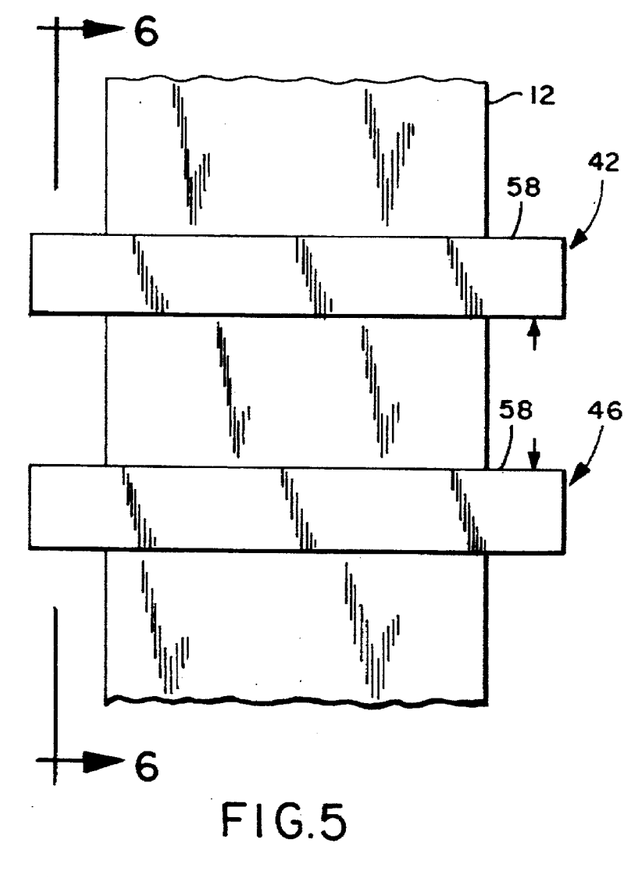
FIG. 5 is schematic side elevation showing the clamping bars for clamping the inner liner.
Figure 6:
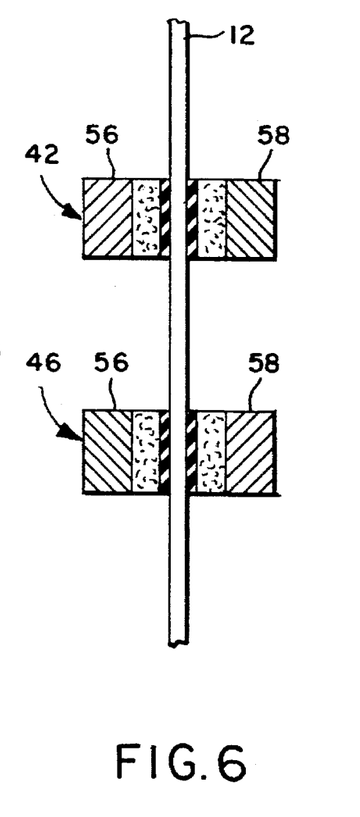
FIG. 6 is a section taken along line 6—6 in FIG. 5 showing the clamping bars with the inner liner in the position at the time of initial clamping shown in FIG. 2.
Figure 13:
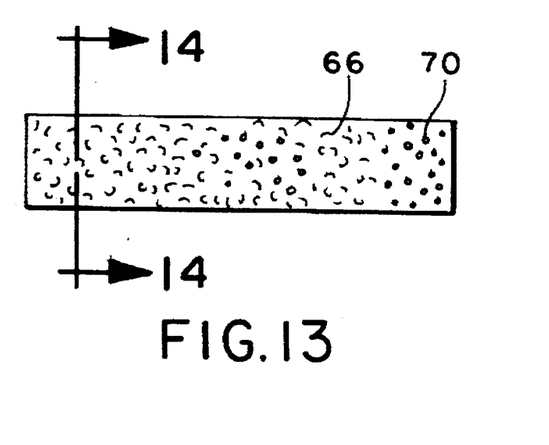
FIGS. 13 and 14 are views of one of the clamping bars.
Figure 14:
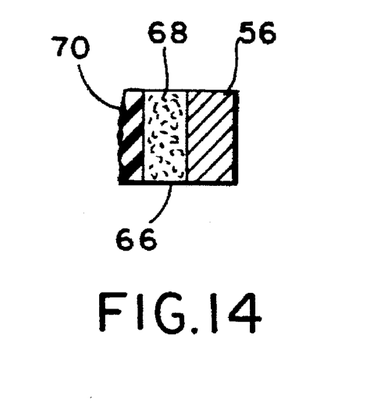

As shown diagrammatically in FIGS. 5 and 6 each of the inner clamping bars 56 and outer clamping bars 58 has shoes 66 for engaging the liner 12 and exerting a uniform pressure across the width of the liner. As shown in FIGS. 13 and 14, the shoe 66 has a cushioning member 68 of high or medium density foam rubber and an adhesion repelling surface layer 70 of non-adhering red rubber which preferably has a knurled surface for gripping the liner. The surface layer 70 may have a thickness of 0.0625 inches (0.158 cm) and a cushioning layer 68 of high or medium density closed cell foam rubber with a thickness of 0.1877 inches (0.476 cm).

Figure 4:
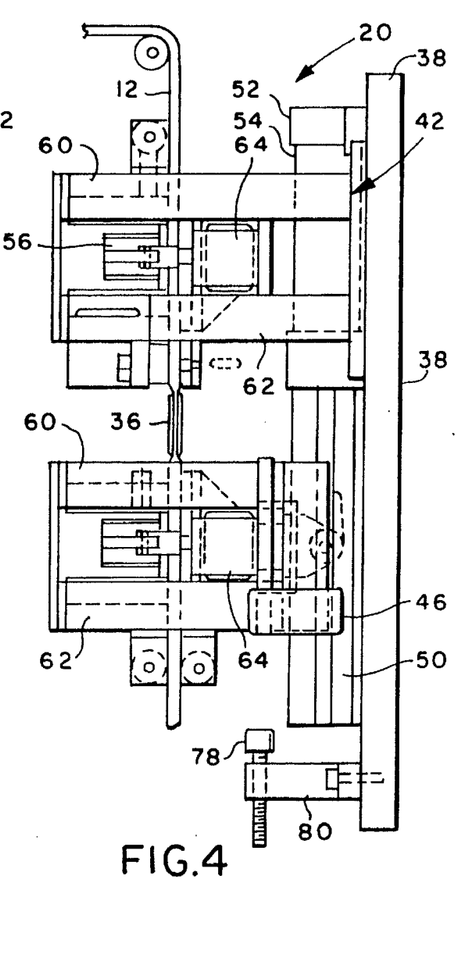
Figures 7, 8:
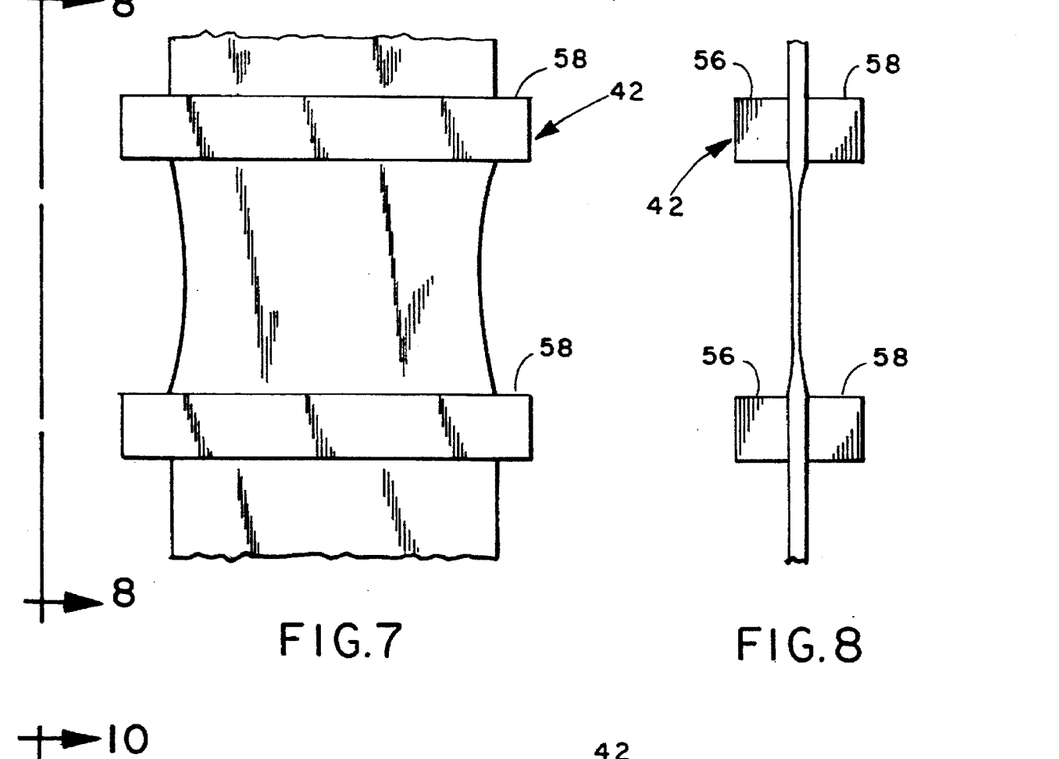
FIGS. 7 and 8 are views like FIGS. 5 and 6 showing the inner liner stretched in the condition of FIG. 3.
Figures 9, 10:
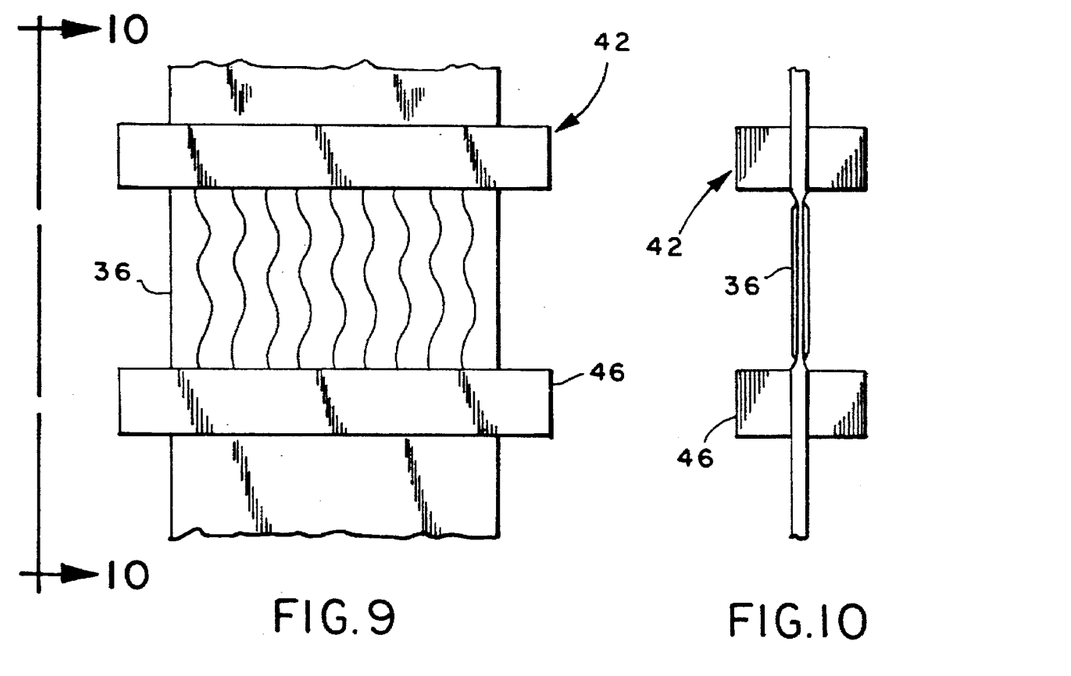
FIGS. 9 and 10 are views like FIG. 5 and 6 showing the position of the clamping bars in the condition shown in FIG. 4.
Figure 11:
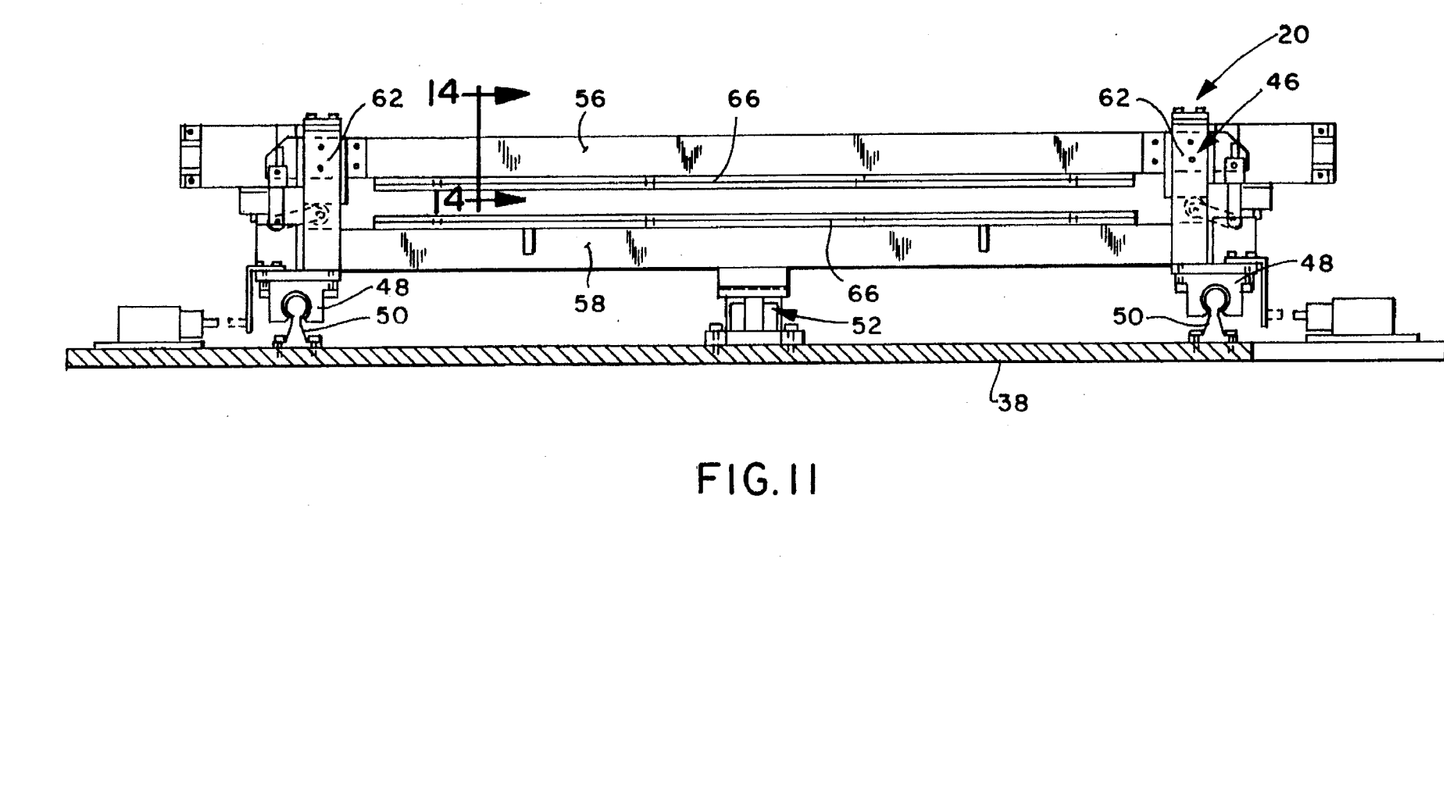
FIG. 11 is a bottom sectional view of the stretching assembly taken along line 11—11 in FIG. 12.
Figure 12:
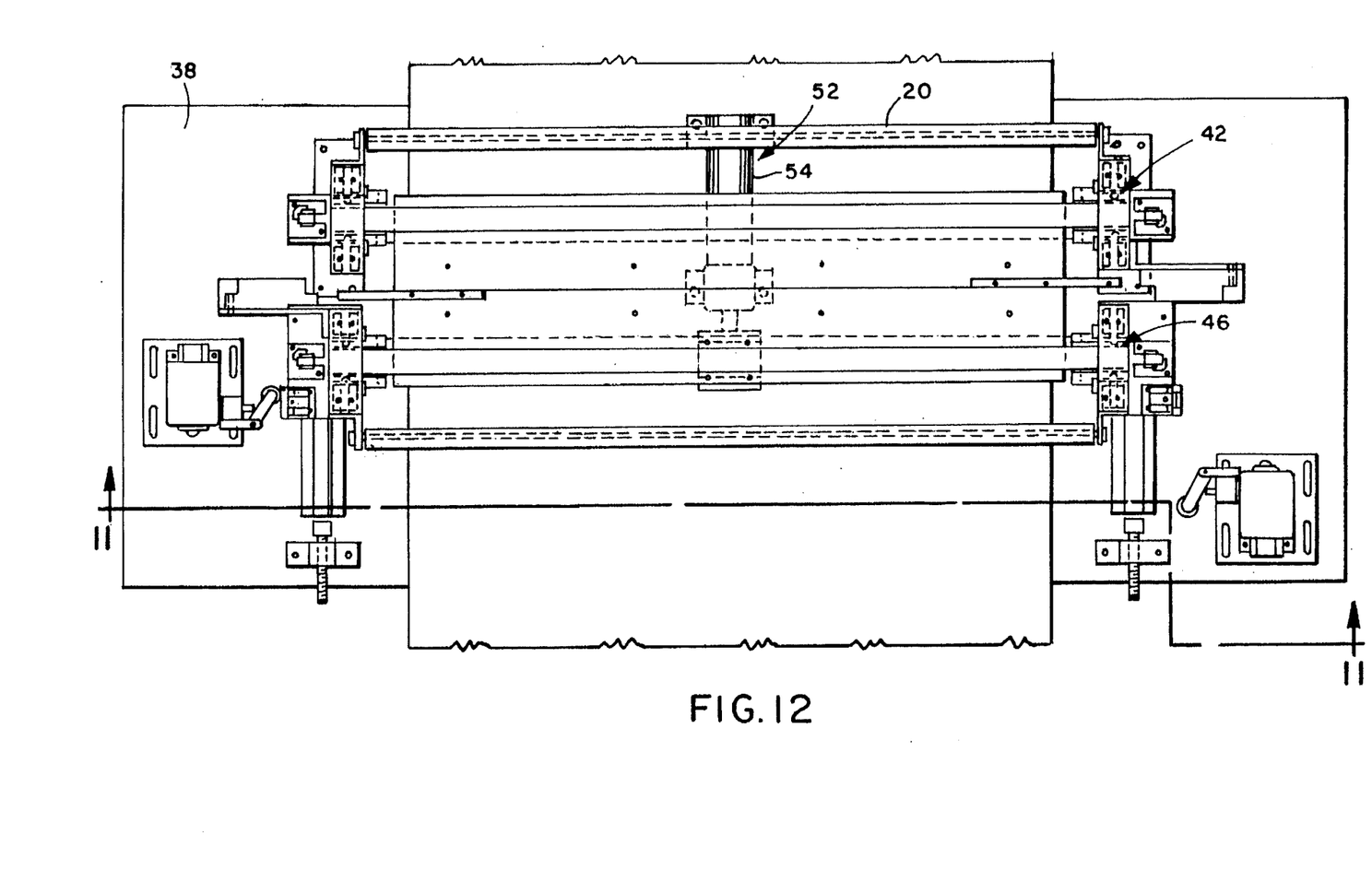
FIG. 12 is an elevation taken along line 12—12 in FIG. 2.
Figure 16:
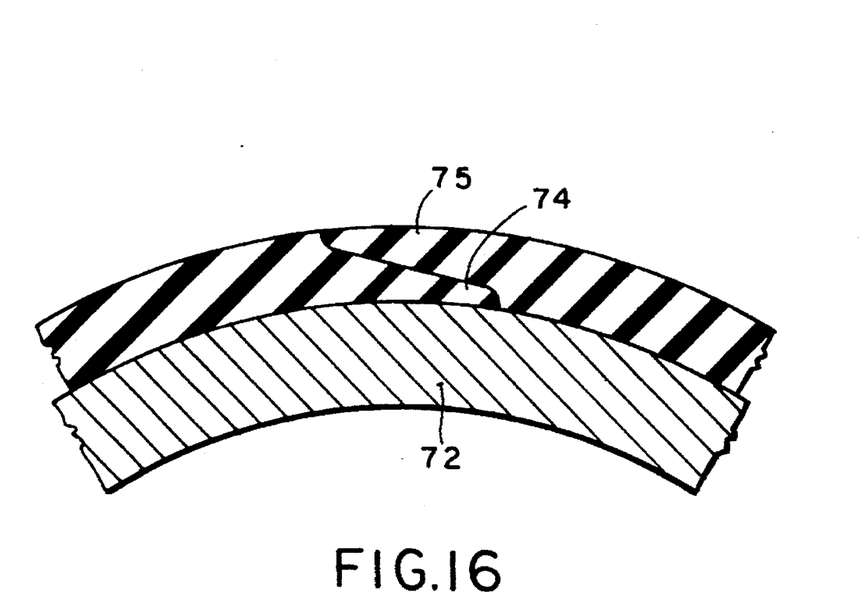
FIG. 16 is a fragmentary sectional view of the inner liner spliced on a tire building drum.

In operation the liner 12 is fed from the let-off roll 14 over the roller 16 and through the festoon 18 between the clamping bars 56 and outer clamping bars 58 of the first clamping assembly 42 and second clamping assembly 46. The inner liner 12 is moved on the conveyor 24 to a position where the end 34 of the inner liner is positioned under the second photoeye 32. In this position the distance between the second photoeye 32 and inner clamping bars 56 and outer clamping bars 58 of the first clamping assembly 42 is equal to the circumference of the tire building drum 72 on which the liner 12 will be wrapped and spliced as shown in FIG. 16. The piston cylinders 64 are then actuated to pull the inner clamping bars 56 into engagement with the outer clamping bars 58 as shown in FIGS. 3, 5 and 6. The piston cylinder assembly 52 is then actuated to move the second clamping assembly 46 downward to the position shown in FIGS. 3, 7 and 8, which stretches the liner 12 beyond the elastic limit. The second clamping assembly 46 is held in the position shown in FIGS. 3, 7 and 8 for a sufficient time for the material to set. It may be two minutes for a liner 12 of green butyl rubber having a thickness of 0.028 inches (0.071 cm) before stretching. This liner has a necked portion one inch (2.54 cm) long with a thickness of 0.012 inches (0.030 cm) after release of the pressure in the piston 52 so that the lower or second clamping assembly 46 will be pulled back into the position shown in FIGS. 4, 9 and 10. The resulting stretched section which is stretched beyond the elastic limit is about one inches long (2.54 cm) and has a thickness of about 0.012 inches (0.030 cm). The stretched section 36 also has a corrugated configuration as shown in FIGS. 4, 9 and 10. This configuration is believed to be caused by the stretching of the material beyond the elastic limit and the inability of the material to resiliently return to its flat original surface configuration.

With the interaction of the inner clamping bars 56 and outer clamping bars 58, the cushioning members 68 and knurled surfaces 70 of the shoes 66, the liner 12 is clamped evenly across its width so that the stretching is uniform.

Figure 15:
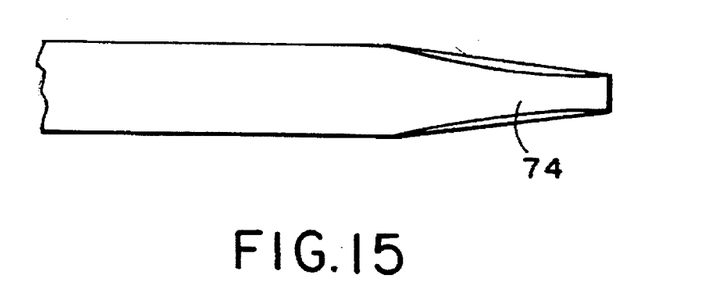
FIG. 15 is fragmentary side view of one of the end edges of the inner liner after cutting.

After stretching of the liner the piston cylinder 64 connected to the inner clamping bars 56 are actuated to release the pressure on the outer clamping bars 58 against the inner clamping bars 56. The horizontal conveyor 24 is then actuated to carry the liner 12 to the left as shown in FIG. 1 a distance such that the end 34 which is under the first photoeye 30 sends a signal to stop the conveyor a distance from the first photoeye 30 to the second photoeye 32 is the same as the distance from the cutter 26 to the first clamping assembly 42. When the liner reaches the position where the end 34 is under the first photoeye 30 the distance between the first photoeye 30 and the cutter 26 is the same as the circumference of the drum 72 on which the liner is wrapped. The conveyor 24 is stopped and the cutter 26 which may be a hot knife is lowered to sever the end 36 of reduced thickness providing a tapered end 74 of corrugated configuration such as that shown in FIG. 15. Tapered end 74 which may be 1.5 inches (3.81 cm) long is then adapted to overlap a similar tapered end 75 to form a splice when the liner 12 is wrapped around the tire building drum 72 as shown in FIG. 16. It has been found that although the tapered end 74 and 75 have a corrugated configuration in the stretched condition, the splice formed by the overlapping of these tapered ends is not adversely affected by the corrugations and no special stitching is required.

Where it is desirable to stretch the section 36 of the inner liner 12 a lesser amount than that shown in FIG. 3, the position of the second clamping assembly 46 in the extended condition may be shortened by means of an adjustment screw 78 threaded in a lug 80 mounted on the supporting plate 38. With reference to FIG. 3, the adjusting screws 78 may be turned causing the screws to be raised and reducing the movement of the clamping assembly 46 downwards as shown in FIG. 3.

The position of the stretching assembly 20 may be at an angle to the vertical or in a horizontal configuration however with the vertical configuration shown in the embodiment illustrated there is less likelihood of the liner 12 being hung up on the inner clamping bars 56 and outer clamping bars 58 when released for movement on the conveyor 24.

The cutter 26 may also be positioned between the first clamping assembly 42 and second clamping assembly 46 for cutting the section 36; however, then the apparatus requires additional conveyors for carrying the leading ends 34 of the liner 12 to the tire building drum 72.

The present invention has been described with reference to a preferred embodiment. Obviously, modifications and alterations will occur to others upon a reading and understanding of this specification. It is intended by the applicants to include all such modifications and alterations insofar as they come within the scope of the appended claims or the equivalents thereof.

Having thus described the invention, it is now claimed: We claim:

1. Apparatus for reducing the thickness and cutting a strip of material comprising;
   a. a first clamping assembly for clamping a first portion of said strip of material;
   b. a second clamping assembly positioned adjacent said first clamping assembly for clamping a second portion of said strip of material;
   c. means for actuating said first clamping assembly and said second clamping assembly to clamp said first portion and said second portion of said strip of material and,
   d. means to separate said first clamping assembly and said second clamping assembly to stretch a section of said strip of material between said first clamping assembly and said second clamping assembly a predetermined distance to stress said section of said strip of material beyond the elastic limit of said material;
   e. a cutter for cutting said section;
   f. a release for said means to separate said first clamping assembly and said second clamping assembly after stretching providing a stretched section of reduced thickness between said first clamping assembly and said second clamping assembly;
   g. said cutter being positioned downstream of said first clamping assembly and said second clamping assembly for cutting said stretched section to provide cut ends having a reduced thickness for splicing without increasing the thickness of the material at the splice;
   h. said cutter being positioned above a horizontal conveyor downstream of said first clamping assembly and said second clamping assembly for cutting said stretched section by vertical movement of said cutter; and
   i. said first clamping and said second clamping assembly being mounted on a frame, said first clamping assembly being mounted at a position above said second clamping assembly and said means to separate said first clamping assembly and said second clamping assembly including means to move said second clamping assembly downwardly on said frame away from said first clamping assembly so that upon release of said sheet member by said first clamping assembly and said second clamping assembly said stretched section is movable with said sheet member to said horizontal conveyor.

2. Apparatus in accordance with claim 1 including measuring apparatus for determining the position of an end of said strip material on said conveyor, a conveyor control responsive to signals from said measuring apparatus for stopping said conveyor in a first position to locate said section adjacent said first clamping assembly and said second clamping assembly for stretching said section and further stopping said conveyor in a second position to locate said section adjacent said cutter for cutting said section on said conveyor.

3. Apparatus for reducing the thickness and cutting a strip of material comprising:
   a. a first clamping assembly for clamping a first portion of said strip of material;
   b. a second clamping assembly positioned adjacent said first clamping assembly for clamping a second portion of said strip of material;
   c. means for actuating said first clamping assembly and said second clamping assembly to clamp said first portion and said second portion of said strip of material;
   d. means to separate said first clamping assembly and said second clamping assembly to stretch a section of said strip of material between said first clamping assembly and said second clamping assembly a predetermined distance to stress said section of said strip of material beyond the elastic limit of said material;
   e. a cutter for cutting said section;
   f. said strip of material being a flat elongated sheet member; said first clamping assembly and said second clamping assembly each extending completely across the width of said sheet member to press the surfaces of said sheet member evenly across the width of said sheet member so that when said first clamping assembly is separated from said second clamping assembly there will be uniform stretching of said section across the width of said sheet member;
   g. said first clamping assembly and said second clamping assembly each having at least one resilient shoe for engaging said sheet member;
   h. said resilient shoe comprising a foam rubber cushioning member for engaging said sheet member; and
   i. said measuring apparatus including a first photoeye positioned over said conveyor responsive to movement of said end of said strip material on said conveyor passing under said photoeye when said section is positioned adjacent said first clamping assembly to stop said conveyor and to actuate said first clamping assembly and said second clamping assembly to hold said strip material and separate said first clamping assembly and said second clamping assembly to stress said section beyond the elastic limit, and a second photoeye positioned over said conveyor at a position downstream from said first photoeye a distance equal to the distance from said first clamping assembly to said cutter, said second photoeye providing a signal in response to movement of said end of said strip material for stopping said conveyor and actuating said cutter to cut said section of said strip material after it is stretched and thereby provide ends of reduced thickness.

4. A method of reducing the thickness and cutting a strip of material comprising:
   a. clamping a first portion of said strip of material with a first clamping assembly at a first position on said strip of material;
   b. clamping a second portion of said strip of material with a second clamping assembly at a second position on said strip of material adjacent said first position;
   c. stretching a section of said strip of material between said first position and said second position by separating said first clamping assembly and said second clamping assembly a distance sufficient to stress said strip of material beyond the elastic limit of said material providing a section of said strip material between said first position and said second position having a reduced thickness;
   d. returning said first clamping assembly and said second clamping assembly to a spaced apart distance less than said distance necessary to stress said strip of material beyond the elastic limit; and
   e. cutting said section between said first position and said second position to provide edges of said strip of material having corrugations and a reduced thickness.

* * * * *